United States Patent [19]
Jacobsen et al.

[11] Patent Number: 5,485,811
[45] Date of Patent: Jan. 23, 1996

[54] STRETCHABLE MOLDED LEASH

[75] Inventors: Chris J. Jacobsen, 4020 County Rd. M, Middleton, Wis. 53562; Kenneth Muderlak, Shorewood, Wis.

[73] Assignee: Chris J. Jacobsen, Middleton, Wis.

[21] Appl. No.: 282,039

[22] Filed: Jul. 28, 1994

[51] Int. Cl.$^6$ .................................................. A01K 27/00
[52] U.S. Cl. .......................................... 119/798; 119/792
[58] Field of Search .................................... 119/792, 793, 119/795, 797, 798, 799, 770; D30/151, 153; 224/184, 267; 273/414, 58 C, 329, 330; 482/44, 49, 124, 126, 906, 907

[56] References Cited

U.S. PATENT DOCUMENTS

| | | |
|---|---|---|
| D. 81,947 | 9/1930 | Vizard . |
| D. 281,631 | 12/1985 | Konar . |
| D. 293,043 | 12/1987 | Zamboni . |
| D. 298,478 | 11/1988 | Ticknor . |
| D. 334,605 | 4/1993 | Forgione . |
| D. 337,182 | 7/1993 | Small et al. . |
| D. 339,885 | 9/1993 | Rebek . |
| 1,924,596 | 8/1933 | Davis ........................... 119/798 |
| 2,194,736 | 3/1940 | Bruler ........................... D30/153 |
| 2,561,487 | 7/1951 | Bailhe ........................... 119/795 |
| 2,908,522 | 10/1959 | Glave . |
| 2,919,946 | 1/1960 | Miener . |
| 2,962,197 | 11/1960 | Spangler, Jr. ................ 224/267 |
| 3,096,741 | 7/1963 | Ollstein ........................ 119/792 |
| 3,332,398 | 7/1967 | Mintz . |
| 3,603,295 | 9/1971 | Shuman . |
| 3,783,835 | 1/1974 | Kepirq . |
| 3,884,190 | 5/1975 | Gurrey . |
| 4,161,051 | 7/1979 | Brodwin . |
| 4,413,589 | 11/1983 | Bielen, Jr. et al. ............ 119/792 |
| 4,488,511 | 12/1984 | Grassano . |
| 4,745,883 | 5/1988 | Baggetta . |
| 4,763,609 | 8/1988 | Kulik . |
| 5,291,856 | 3/1994 | Goller . |
| 5,351,654 | 10/1994 | Fuentes ........................ 119/795 |

*Primary Examiner*—Todd E. Manahan
*Attorney, Agent, or Firm*—DeWitt Ross & Stevens

[57] ABSTRACT

A stretchable leash which forms a continuous one-piece structure is described. The stretchable leash generally includes a substantially planar, one-piece molded unit having a handle portion and a lead portion. The stretchable leash does not contain any physical connection points between the handle portion and the lead portion.

20 Claims, 2 Drawing Sheets

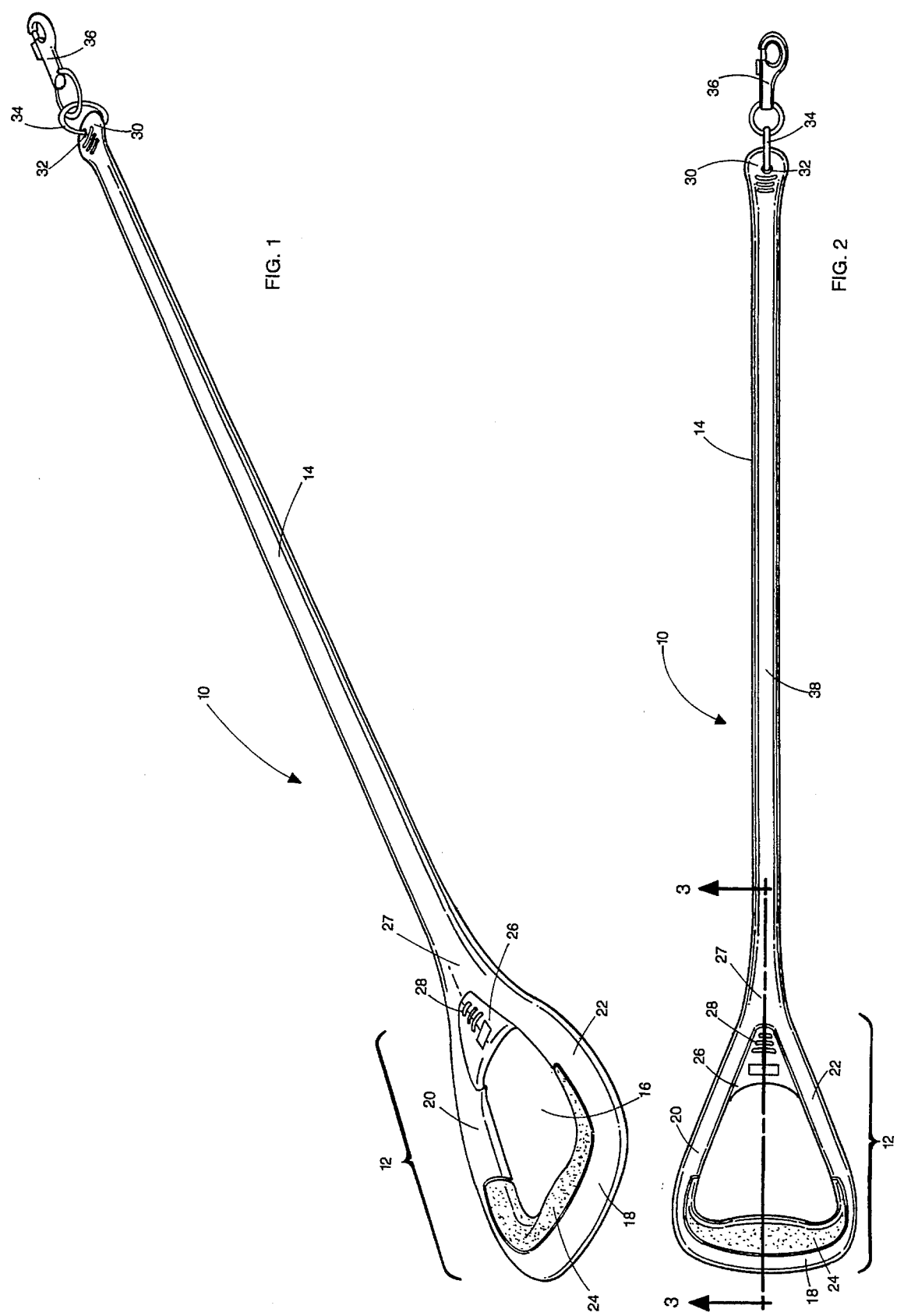

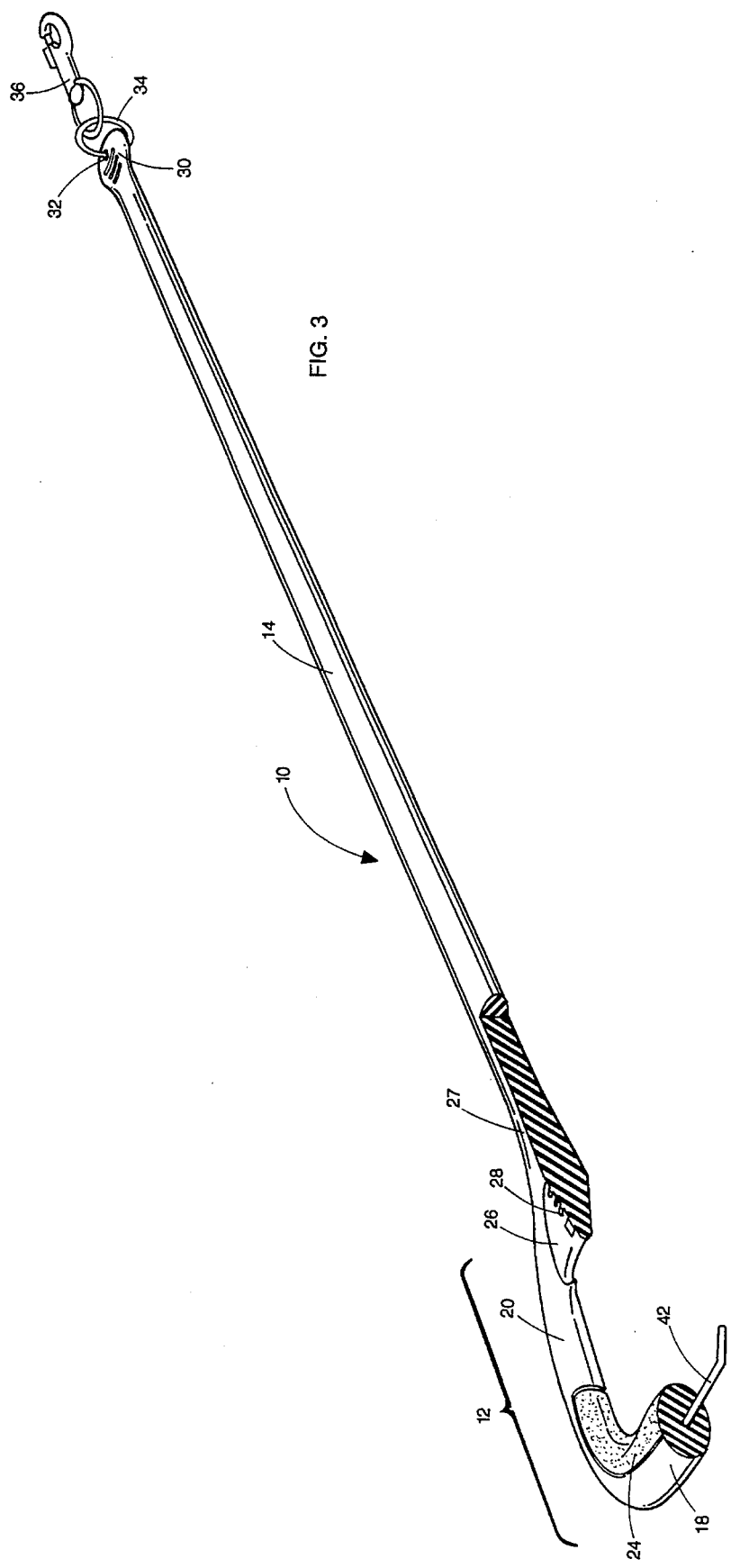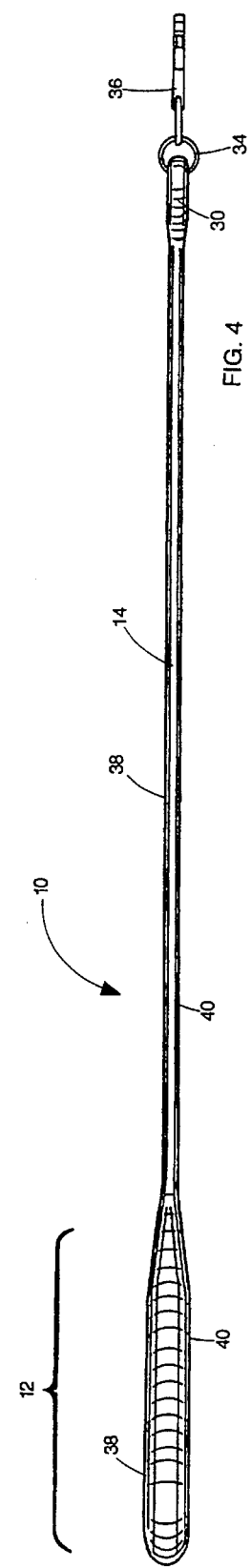

STRETCHABLE MOLDED LEASH

FIELD OF THE INVENTION

The present invention relates generally to a leash which is flexible and stretchable. More particularly, the present invention relates to an animal leash having a handle wherein the handle and leash comprise one continuous molded piece with no attachment or connection areas.

DESCRIPTION OF THE PRIOR ART

A variety of animal leashes, including some that are expandable, are presented in the prior art. For example, U.S. Pat. No. 4,745,883 to Small et al. discloses a stretchable animal leash having a handle portion and a lead portion which are both attached to a rod shaped member. The attachment to the rod shaped member is made by sliding the respective ends of the handle and lead portions, which comprise stretchable tubular structures, over the rod shaped member.

U.S. Pat. No. 4,448,511 to Grassano describes a shock-absorbent animal leash which incorporates a shock-absorbent device. The shock-absorbent device comprises a pneumatic cylinder having a piston which is connected to the animal and retained in a contracted position by a compressive spring.

U.S. Pat. No. 5,291,856 to Goller discloses an animal leash having a stiffening member on its distal end. The leash comprises a long flexible lead and a coiled member which extends around a portion of the lead to stiffen that part of the lead.

U.S. Pat. No. Des.339,885 to Rebek shows a design for a dog leash wherein the handle of the leash is padded.

U.S. Pat. No. 3,783,835 to Kepirq discloses an animal leash having a loop on each of its ends. The two looped ends are formed without utilizing fastening structures by forming slits in the leash near both of its ends and folding the ends of the leash through the slits, thereby braiding the ends of the leash into a loop.

In addition to animal leashes, several other restraint type devices also exist in the prior art. For example, U.S. Pat. No. 4,745,883 to Baggetta describes a safety tether device which includes a unitary stretch member having first and second ends. Each of the first and second ends is then sewn to the unitary stretch member at a point near its respective location to form a loop at each end of the restraint device.

Another restraint device is shown in U.S. Pat. No. 2,919,946 to Miener. The Miener patent describes a trunk-lid holding device which comprises a resilient strap member having a substantially Y-shaped construction. The device further comprises a clamp element located at the base of the "Y" for attachment to the automobile at an area underneath the trunk, and means for attaching the divergent arms of the Y-shaped strap to the lid of the trunk.

Although some of the prior art animal leashes are resilient or expandable, none of the prior art animal leashes are comprised of a unitary structure which does not require any attachment or manipulation at one of its ends to form a handle to accommodate a user's hand. Other prior art restraint devices also fail to show a unitary structure having a handle which does not require some attachment means for attaching the handle to the unitary structure.

Accordingly, there is a need for an expandable or stretchable animal leash which comprises one continuous piece with no attachments. Such an animal leash can sustain additional resistant forces which are created when the animal or user pulls on the leash without risking the breakage or failure of the leash at its connection points, such as the points where the handle is connected to the lead of the leash.

SUMMARY OF THE INVENTION

It is a principal object of the present invention to provide a flexible and stretchable animal leash.

It is a further object of the present invention to provide a molded one piece animal leash that has no attachment or connection points and in particular no connection points between the handle and the lead of the leash.

It is still a further object of the present invention to provide an animal leash that can be mass produced by compression or injection molding with a minimal amount of manual labor.

It is yet a further object of the present invention to provide a one piece molded animal leash having infinite elastic deformation characteristics.

It is a still further object of the present invention to provide an animal leash which can sustain the resistant forces created without risking the breakage or failure of the leash when an animal or user pulls on the leash.

The stretchable leash generally includes a continuous one-piece molded structure having a handle portion and a lead portion.

The stretchable one-piece molded animal leash having a handle portion and lead portion may further include a generally triangular shaped handle having its center area cut out such that the lead portion of the leash extends from an outer point of the triangular shaped handle.

Advantages of the stretchable molded animal leash of the present invention over existing animal leashes include its increased strength and resiliency, its low risk of failure due to breakage of the shaft and breakage at handle and lead connection points, and its economy due to capability of large scale production without the need for substantial manual labor. The stretchable molded animal leash also reduces the shock to both the user and the animal which is generated from the resistive forces created by pulling or tugging on the leash. Finally, the stretchable molded animal leash provides a no-slip grip surface which facilitates its use by the user.

The objects and advantages of the invention will appear more fully from the following more detailed description of the preferred embodiment of the invention made in conjunction with the accompanying drawings.

BRIEF DESCRIPTION OF THE DRAWINGS

FIG. 1 is a perspective view of a stretchable leash in accordance with the present invention.

FIG. 2 is a top elevational view of the stretchable leash in accordance with the present invention.

FIG. 3 is a partial cross-sectional view of the stretchable leash in accordance with the present invention taken along line 3—3 of FIG. 2.

FIG. 4 is a side elevational view of the stretchable leash in accordance with the present invention.

DETAILED DESCRIPTION OF THE INVENTION

The present invention provides a stretchable leash which has infinite elastic deformation characteristics prior to material failure. Referring now to the figures, where numerals represent various elements of the present invention, the stretchable leash is generally illustrated in FIG. 1.

The stretchable leash 10 generally comprises a one-piece molded structure having a handle portion 12 and a lead portion 14. The handle portion 12 and the lead 14 are contiguous with one another and are molded from the same material.

A variety of materials may be used to produce the stretchable leash. The ideal material exhibits infinite elastic deformation characteristics with a low risk of material failure due to stretching. Examples of such a material include, but are not limited to, rubber, rubber compounds, neoprene, silicone, butyl, hypalon, and thermo plastic elastomers.

The stretchable leash is preferably produced by compression or injection molding. The molding of the stretchable leash results in a continuous one-piece structure which is void of non-molded connection points thereby providing a stretchable leash which is less likely to fail at its connection points when resistent forces are applied to the leash. The stretchable leash 10 may vary in length from one foot to eight feet depending on the purpose for using the leash. A shorter stretchable leash may be desired to exhibit a greater amount of control over an animal during training.

The handle portion 12 of the leash comprises a generally triangular shape having an opening 16 through its center such that the handle includes a base member 18 and two side members 20,22. The two side members 20,22 extend from the base member 18 and then join to further form the shaft or lead portion 14 of the stretchable leash 10. As indicated previously, the stretchable leash 10 is produced by molding to form a one-piece continuous structure which does not contain any actual physical connection points. Both the lead portion 14 and the handle portion 12 of the stretchable leash 10 exhibit maximum elastic deformation characteristics.

The handle portion 12 of the leash may further contain a grip pad 24 which is located on an interior area of the handle portion 12 adjacent to the opening 16 contained in the handle portion 12. As shown in FIG. 1, the grip pad 24 may extend along an entire length of the base member 18 of the handle portion 12 and further extend along the length of each of the two side members 20, 22 of the handle portion 12.

Furthermore, the grip pad 24 may contain an ergonomically arched surface to provide a user with maximum comfort and efficiency while using the stretchable leash 10. Finger detailing similar to that contained in a bicycle hand grip may also be added to the grip pad 24 to provide a user with a grip surface which naturally conforms to the user's fingers.

The handle portion 12 of the stretchable leash 10 may further include a strengthening piece 26 located adjacent to that area of the opening 16 where the side members 20, 22 of the handle portion 12 join together and further extend to form the lead portion 14 of the stretchable leash 10. The strengthening piece 26 functions to enhance the strength and rigidity of the stretchable leash 10 where the handle portion 12 extends to form the lead portion 14. Finger detailing, such as the series of ridges 28 shown in FIG. 1, may also be added to the strengthening piece 26. A user may employ an alternative gripping means to use the stretchable leash 10 by extending his/her hand through the opening 16 in the handle portion 12 of the stretchable leash 10. The user then grasps an upper area 27 of the lead portion 14 of the leash 10 such that the base member 18 or grip pad 24 of the handle portion 12 rests on top of the user's wrist.

The lead portion 14 terminates in a generally circular shaped end 30 which exists opposite the handle portion 12 of the stretchable leash 10. The circular end 30 comprises a small hole 32 which functions as an attachment point for a ring 34 or ring clip 36. The ring clip 36 functions to connect the stretchable leash 10 to an animal collar.

Turning now to FIG. 2, there is shown a top elevational view of the stretchable leash 10. The continuous one-piece molded structure which comprises the stretchable leash 10 is substantially planar. FIG. 4 illustrates a side elevational view of the stretchable leash 10. The substantially planar continuous stretchable leash which comprises both a handle portion 12 and a lead portion 14 further comprises a continuous first upper surface 38 and a continuous second lower surface 40. Although the stretchable leash 10 may also comprise a non-planar configuration, a substantially planar configuration and design of the stretchable leash 10 enhances the extensibility of the leash 10.

The alternative attachment of either a ring clip 36 alone, or a ring clip 36 in conjunction with a ring 34, to the circular end 30 of the lead portion 14 of the stretchable leash 10 will depend on the desired orientation of the clip member relative to the lead portion 14 of the leash 10. The attachment of a ring clip 36 to the hole 32 in the stretchable leash 10 will provide a leash 10 which lies perpendicular to its attachment to an animal collar thereby subtly forcing the planar surfaces 38,40 of the leash 10 to be held perpendicular to the ground.

Alternatively, the attachment of ring 34 to the hole 32 in the stretchable leash 10 and further attachment of the ring clip 36 to the ring 34 will provide a leash 10 which lies planar to its attachment to an animal collar. This attachment configuration will allow the planar surfaces 38,40 of the stretchable leash 10 to easily be held planar relative to the ground.

FIG. 3 illustrates a partial cross-sectional view of the stretchable leash 10 taken along lines 3—3 of FIG. 2. As shown in FIG. 3, a support piece 42 may be contained within the handle portion 12 of the stretchable leash 10. The support piece 42 may comprise a rod shaped member like that illustrated in FIG. 3, or a planar plate shaped member (not shown).

Furthermore, the support piece 42 may extend along the entire length or a portion of the length of the base member 18 of the handle portion 12. Alternatively, the support piece 42 may extend along the entire length of the base member 18 and further extend along a length of the side members 20,24 of the handle portion 12 of the stretchable leash 10. The support piece 10 is preferably comprised of a metal or plastic material so that the support piece 10 provides the handle portion 12 of the stretchable leash 10 with additional strength, rigidity and weight.

While the preferred embodiment of the invention has been shown and described, it will be apparent to those skilled in the art that various modifications may be made to the embodiment without departing from the spirit of the present invention. Therefore, all suitable modifications and equivalents fall within the scope of the invention.

What is claimed is:

1. A one-piece molded animal leash comprising a handle and a lead, wherein the handle includes a base member, two side members, and a web-like generally planar strengthening piece, wherein the Side members extend from the base member to the lead to define a generally triangular shape for the handle, and further wherein the strengthening piece extends from one side member to the other side member and is oriented generally parallel to the plane defined by the handle.

2. The animal leash of claim 1 wherein said handle further comprises a substantially inflexible support member embedded therein.

3. The animal leash of claim 2 wherein said support member is a rod-shaped structure.

4. The animal leash of claim 3 wherein said support member is comprised of at least one of a metal material and a plastic material.

5. The leash of claim 2 wherein said support member is disposed within said base member of said handle.

6. The leash of claim 5 wherein said support member extends to be disposed within said side members.

7. The animal leash of claim 1 wherein said leash further comprises a generally planar structure.

8. The handle of claim 1 wherein said base comprises at least one of a textured surface and a padded surface.

9. The animal leash of claim 1 wherein said leash is comprised of a stretchable material.

10. The animal leash of claim 9 wherein said stretchable material comprises at least one of the group consisting of rubber, neoprene, silicone, butyl, hypalon, and thermo plastic elastomer.

11. The leash of claim 1 wherein said strengthening piece further includes ridges formed thereupon.

12. The leash of claim 11 wherein said ridges are oriented generally parallel to the base member.

13. A one-piece molded leash comprising a handle, a strengthening piece including ridges thereupon, and a lead, wherein the handle is generally triangular in shape with a center opening therethrough and the lead continuously extends from an outer point of the generally triangular shaped handle, and further wherein the strengthening piece is attached to the handle and bridges the center opening at a point adjacent the lead.

14. The leash of claim 13 wherein the handle comprises at least one of a textured surface and a padded surface.

15. The leash of claim 13 wherein the continuous one-piece molded structure is generally planar in shape.

16. The leash of claim 13 wherein said handle portion further comprises a substantially inflexible support piece contained therein.

17. The leash of claim 13 wherein the continuous one-piece molded structure is comprised of a flexible material.

18. The leash of claim 17 wherein said flexible material comprises at least one of the group consisting of rubber, neoprene, silicone, butyl, hypalon, and thermo plastic elastomer.

19. The leash of claim 13 wherein said ridges are oriented generally perpendicularly to said lead portion.

20. A one-piece molded animal leash comprising a lead, a base member, two side members, and a strengthening piece having ridges thereupon, wherein each side member extends from said lead to respective ends of said base member to define a handle having a generally triangular shape, and wherein said strengthening piece bridges said side members at points on said side members adjacent said lead.

* * * * *